US012049213B2

(12) United States Patent
Yamamoto

(10) Patent No.: US 12,049,213 B2
(45) Date of Patent: Jul. 30, 2024

(54) BRAKE CONTROL DEVICE FOR VEHICLE

(71) Applicant: ADVICS CO., LTD., Kariya (JP)

(72) Inventor: Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 634 days.

(21) Appl. No.: 17/256,884

(22) PCT Filed: Aug. 29, 2019

(86) PCT No.: PCT/JP2019/033892
§ 371 (c)(1),
(2) Date: Dec. 29, 2020

(87) PCT Pub. No.: WO2020/045565
PCT Pub. Date: Mar. 5, 2020

(65) Prior Publication Data
US 2021/0261106 A1 Aug. 26, 2021

(30) Foreign Application Priority Data
Aug. 29, 2018 (JP) .................................. 2018-160192

(51) Int. Cl.
*B60T 8/40* (2006.01)
*B60T 8/1755* (2006.01)
(Continued)

(52) U.S. Cl.
CPC .......... *B60T 8/1755* (2013.01); *B60T 8/1761* (2013.01); *B60T 8/441* (2013.01); *B60T 8/4836* (2013.01)

(58) Field of Classification Search
CPC .... B60T 8/4081; B60T 8/1755; B60T 8/1761; B60T 8/441; B60T 8/4836; B60T 13/686;
(Continued)

(56) References Cited

U.S. PATENT DOCUMENTS 5,568,962 A * 10/1996 Enomoto .............. B60L 3/0046
303/3
2006/0066146 A1* 3/2006 Otomo .................. B60T 13/147
303/151
(Continued)

FOREIGN PATENT DOCUMENTS

JP 2010000926 A 1/2010
JP 2013193664 A 9/2013
(Continued)

OTHER PUBLICATIONS

International Search Report (PCT/ISA/210) issued on Oct. 29, 2019, by the Japanese Patent Office as the International Searching Authority for International Application No. PCT/JP2019/033892.

*Primary Examiner* — Nicholas J Lane
*Assistant Examiner* — Stephen M Bowes
(74) *Attorney, Agent, or Firm* — BUCHANAN INGERSOLL & ROONEY PC

(57) ABSTRACT

A brake control device includes an electric pump, a pressure adjustment valve that adjusts a hydraulic pressure of a brake fluid discharged by the electric pump to an adjustment hydraulic pressure and supplies the brake fluid in a rear wheel cylinder, and a master unit provided with a servo chamber into which brake fluid at the adjustment hydraulic pressure is supplied and in which the adjustment hydraulic pressure is converted into a forward force of a master piston, and a master chamber fluidically separated from the servo chamber by the master piston and connected to the front wheel cylinder and in which a rearward force converted from the hydraulic pressure in the front wheel cylinder and is applied to the master piston. Also included is an input unit provided with an input chamber and a simulator, and a controller configured to control the electric pump and the pressure adjustment valve.

2 Claims, 4 Drawing Sheets

(51) Int. Cl.
*B60T 8/1761* (2006.01)
*B60T 8/44* (2006.01)
*B60T 8/48* (2006.01)

(58) Field of Classification Search
CPC . B60T 13/662; B60T 2201/10; B60T 2201/20
See application file for complete search history.

(56) References Cited

U.S. PATENT DOCUMENTS

| | | | |
|---|---|---|---|
| 2007/0114842 A1* | 5/2007 | Ohkubo | B60T 8/4081 |
| | | | 303/115.1 |
| 2010/0283315 A1 | 11/2010 | Isono | |
| 2014/0052339 A1* | 2/2014 | Takahashi | B60T 7/042 |
| | | | 701/41 |
| 2015/0151729 A1 | 6/2015 | Yamasoe et al. | |
| 2015/0291141 A1* | 10/2015 | Miyazaki | B60T 7/042 |
| | | | 303/10 |
| 2015/0314765 A1 | 11/2015 | Maruo et al. | |
| 2017/0137006 A1* | 5/2017 | Kuhlman | B60T 13/146 |

FOREIGN PATENT DOCUMENTS

| | | |
|---|---|---|
| JP | 2014015200 A | 1/2014 |
| JP | 2014118014 A | 6/2014 |

* cited by examiner

BRAKE CONTROL DEVICE FOR VEHICLE

TECHNICAL FIELD

The present disclosure relates to a brake control device for a vehicle.

BACKGROUND ART

PTL 1 discloses that, for the purpose of downsizing of a device and improving the layout, a small diameter piston 10 that receives a brake operation from a driver is inserted through a large diameter piston 11 that partitions a master cylinder MC into a pressure chamber 1 and a back pressure chamber 2, the back pressure chamber 2 is connected to rear wheel cylinders WCRL and WCRR and the pressure chamber 1 and front wheel cylinders WCFL and WCFR are connected, and pumps 301 and 302 that supply pressures to the back pressure chamber 2 are driven such that a pressure of the back pressure chamber 2 becomes a target hydraulic pressure of the back pressure chamber corresponding to a brake pedal stroke.

PTL 2 discloses that, for the purpose of "providing a brake device capable of improving pressure-increasing response of a wheel cylinder hydraulic pressure", "the brake device includes a master cylinder 5 that is operated by a brake operation from a driver, connected with a wheel cylinder 8 via a first oil passage 11, and capable of increasing a wheel cylinder hydraulic pressure, a pump 7 that is connected with the wheel cylinder 8 via the first oil passage 11 and capable of increasing a wheel cylinder hydraulic pressure, and an auxiliary pressure increasing unit (an auxiliary pressure increasing unit 106 and a stroke simulator 27) that assists the pressure increase of the wheel cylinder hydraulic pressure by the master cylinder 5 or the pump 7".

In the device disclosed in PTL 1, since a stroke simulator is omitted, oil passages p3 and p4 which are discharge destinations of the two pumps 301 and 302 are appropriately switched by electromagnetic valves 211 and 212. A pedal reaction force (an operation force) of a brake pedal BP is generated according to a relationship between an amount of a brake fluid flowing from the pumps 301 and 302 and an amount of a fluid flowing from a proportional electromagnetic valve 202 to an oil passage p6, and characteristics of a reaction force spring 16. With such a configuration, a pressure of the back pressure chamber 2 is likely to be affected by a pressure fluctuation (a pump pulsation) of the pumps 301 and 302. Particularly, when a hydraulic pressure pulsation caused by rotation speeds of the pumps 301 and 302 is close to a natural frequency of the reaction force spring 16, a resonance phenomenon is likely to occur. Therefore, in a brake-by-wire configuration for performing a regenerative cooperation control or the like, it is desirable that an operation force generation unit (for example, a simulator) of the brake pedal BP is fluidically separated from a pressure adjustment unit.

In the device disclosed in PTL 1, in a case where an electrical system fails, the driver depresses the brake pedal BP to move forward the small diameter piston 10. When a restriction member 15 comes into contact with the large diameter piston 11 by moving forward the small diameter piston 10, both the small diameter piston 10 and the large diameter piston 11 are moved forward to send a brake fluid to a wheel cylinder WC, and a brake hydraulic pressure of the pressure chamber 1 can be increased (see FIG. 10 in PTL 1). At this time, a volume of the back pressure chamber 2 is increased, and the brake fluid is suctioned from a reservoir tank RSV via a cup seal. However, even when the brake pedal BP is returned, since the proportional electromagnetic valve 202 is set to an OFF position, the brake fluid in the back pressure chamber 2 is not returned to the reservoir tank RSV and a brake hydraulic pressure is not reduced. The device disclosed in PTL 1 needs to be improved in terms of this point.

In the device disclosed in PTL 2, during normal braking (operation states during an auxiliary pressure increase, during depression force braking, during switching from depression force braking to a boost control, during a boost control (a pressure increase), and during a boost control (a pressure decrease)), communication valves 23P and 23S are set to ON positions and fluid passages of two systems communicate with each other (see FIGS. 3 to 7 in PTL 2). With such a configuration, in a case where a wheel cylinder is broken, a large amount of brake fluids may flow out of the device. Therefore, it is desirable that the fluid passages of the two systems are fluidically separated at least during normal braking.

CITATION LIST

Patent Literature

PTL 1: JP-A-2013-193664
PTL 2: JP-A-2014-118014

SUMMARY OF INVENTION

Technical Problem

An object of the disclosure is to provide a brake control device having a brake-by-wire configuration for achieving a regenerative cooperation control, in which operation characteristics of a brake operation member are good, and two brake systems are fluidically separated at least during normal braking.

Solution to Problem

A brake control device for a vehicle according to the disclosure adjusts hydraulic pressures (Pwf and Pwr) in front wheel and rear wheel cylinder (CWf and CWr) in response to an operation of a brake operation member (BP) of the vehicle. The brake control device for a vehicle includes an electric pump (DC) connected to a reservoir (RV) of the vehicle, a pressure adjustment valve (UA) that adjusts a hydraulic pressure of a brake fluid (BF) discharged by the electric pump (DC) to an adjustment hydraulic pressure (Pa) and supplies the brake fluid (BF) to the rear wheel cylinder (CWr) via a rear wheel servo fluid passage (HR), a master unit (YM) provided with a servo chamber (Rs) and a master chamber (PM), the servo chamber into which the brake fluid at the adjustment hydraulic pressure (Pa) is supplied and in which the adjustment hydraulic pressure (Pa) is converted to a forward force (Fa) of a master piston (PM) and the master chamber (Rm) that is fluidically separated from the servo chamber (Rs) by the master piston (PM), that is connected to the front wheel cylinder (CWf), in which a rearward force that is converted from the hydraulic pressure (Pwf) of the front wheel cylinder (CWf) and is applied to the master piston (PM), a direction of the rear force (Fb) is opposite to the direction of the forward force (Fa), an input unit (YK) provided with an input chamber (Rn) whose volume changes corresponding to an operation of the brake operation member (BP) and a simulator (SS) that is configured to apply an operation force (Fp) to the brake operation member (BP) in response to a flow of the brake fluid (BF) from the input chamber (BF), and a controller (ECU) that controls the electric pump (DC) and the pressure adjustment valve (UA).

According to the above configuration, the front wheel cylinder CWf and the rear wheel cylinder CWr are fluidically separated by the master piston PM. That is, between fluid passages (between a master cylinder fluid passage HM and the rear wheel servo fluid passage HR) of two systems, a force can be transmitted but the brake fluid BF does not flow. During normal braking including a regenerative cooperation control (when a slip control is not performed), brake systems (fluid passages) are preferably failsafe since the brake systems are separated into two systems. The simulator SS is fluidically separated from the servo chamber Rs. Therefore, the operation force Fp is less likely to be affected by a pulsation of hydraulic pressures of the electric pump DC. As a result, good operation characteristics of the brake operation member BP can be ensured.

The brake control device for a vehicle according to the disclosure is applied to a vehicle provided with a regenerative generator (GN) connected to at least front wheel (WHf). The brake control device for a vehicle adjusts hydraulic pressures (Pwf and Pwr) of front wheel and rear wheel cylinder (CWf and CWr) in response to an operation of a brake operation member (BP) of the vehicle. The brake control device includes an electric pump (DC) connected to a reservoir (RV) of the vehicle, a first pressure adjustment valve (UB) that adjusts a pressure of a brake fluid (BF) discharged by the electric pump (DC) to a first adjustment hydraulic pressure (Pb) and that supplies the brake fluid (BF) to the rear wheel cylinder (CWr) via a first servo fluid passage (HB), a second pressure adjustment valve (UC) that reduces the first adjustment hydraulic pressure (Pb) to a second adjustment hydraulic pressure (Pc) less than the first adjustment hydraulic pressure (Pb), a master unit (YM) provided with a servo chamber (Rs) and a master chamber (Rm), the servo chamber (Rs) into which the second adjustment hydraulic pressure (Pc) is supplied via a second servo fluid passage (HC) and in which the second adjustment hydraulic pressure (Pc) is converted to a forward force (Fa) of a master piston (PM) and a master chamber (Rm) that is fluidically separated from the servo chamber (Rs) by the master piston (PM), that is connected to the front wheel cylinder (CWf), in which a rearward force (Fb) that is converted from the hydraulic pressure (Pwf) of the front wheel cylinder (CWf) and is applied to the master piston (PM), a direction of the rear force (Fb) is opposite to the direction of the forward force (Fa), an input unit (YK) provided with an input chamber (Rn) whose volume changes corresponding to an operation of the brake operation member (BP) and a simulator (SS) that is configured to apply an operation force (Fp) to the brake operation member (BP) in response to a flow of the brake fluid (BF) from the input chamber (Rn), and a controller (ECU) that controls the electric pump (DC) and the first and second pressure adjustment valves (UB and UC).

The brake control device for a vehicle according to the disclosure is applied to a vehicle provided with a regenerative generator (GN) connected to at least rear wheel (WHr). The brake control device adjusts hydraulic pressures (Pwf and Pwr) of a front wheel and a rear wheel cylinder (CWf and CWr) according to an operation of a brake operation member (BP) of the vehicle. The brake control device includes an electric pump (DC) connected to a reservoir (RV) of the vehicle, a first pressure adjustment valve (UB) that adjusts a hydraulic pressure of a brake fluid (BF) discharged by the electric pump (DC) to a first adjustment hydraulic pressure (Pb), a second pressure adjustment valve (UC) that reduces the first adjustment hydraulic pressure (Pb) to a second adjustment hydraulic pressure (Pc) less than the first adjustment hydraulic pressure (Pb) and that supplies the brake fluid (BF) at the second adjustment hydraulic pressure (Pc) to the rear wheel cylinder (CWr) via a second servo fluid passage (HC), a master unit (YM) provided with a servo chamber (Rs) and the master chamber (Rm), the servo chamber (Rs) into which the brake fluid (BF) at the first adjustment hydraulic pressure (Pb) is supplied via a first servo fluid passage (HB) and in which the first adjustment hydraulic pressure (Pb) is converted to a forward force (Fa) of a master piston (PM) and the master chamber (Rm) that is fluidically separated from the servo chamber (Rs) by the master piston (PM), that is connected to the front wheel cylinder (CWf), in which a rearward force (Fb) that is converted from the hydraulic pressure (Pwf) of the front wheel cylinder (CWf) and is applied to the master piston (PM), a direction of the rear force (Fb) is opposite to the direction of the forward force (Fa), an input unit (YK) provided with an input chamber (Rn) whose volume changes corresponding to an operation of the brake operation member (BP) and a simulator (SS) that applies an operation force (Fp) to the brake operation member (BP) in response to a flow of the brake fluid from the input chamber (Rn), and a controller (ECU) that controls the electric pump (DC) and the first and second pressure adjustment valves (UB and UC).

According to the above configuration, the front wheel hydraulic pressure Pwf and the rear wheel hydraulic pressure Pwr are respectively adjusted by the first and second adjustment hydraulic pressures Pb and Pc. Therefore, sufficient regenerative energy is ensured and a front-rear distribution of a brake force is appropriate, so that deceleration and stability of the vehicle can be ensured. In addition, the front wheel cylinder CWf, the rear wheel cylinder CWr, and the simulator SS are fluidically separated by the master piston PM as described above. Therefore, an influence from a pulsation of a fluid pump HP can be reduced, operation characteristics of the brake operation member BP can be maintained well, and reliability of the device can be improved.

DESCRIPTION OF EMBODIMENTS

<Reference Signs of Components, etc. and Subscripts at Ends of Reference Signs>

In the following description, components, calculation processing, signals, characteristics, and values denoted by the same reference signs, such as "ECU", have the same functions. Subscripts "i" to "l" appended to ends of symbols related to wheels are comprehensive reference signs indicating which wheel each of the reference signs is related to. Specifically, "i" indicates a right front wheel, "j" indicates a left front wheel, "k" indicates a right rear wheel, and "l" indicates a left rear wheel. For example, among four wheel cylinders, a right front wheel cylinder is denoted by CWi, a left front wheel cylinder is denoted by CWj, a right rear wheel cylinder is denoted by CWk, and a left rear wheel cylinder is denoted by CWl. The subscripts "i" to "l" at the ends of the reference signs may be omitted. When the subscripts "i" to "l" are omitted, each reference sign indicates a general term for the four wheels. For example, "WH" represents each wheel and "CW" represents each wheel cylinder.

Subscripts "f" and "r" attached to ends of reference signs related to two brake systems are comprehensive reference signs indicating which system of front and rear wheel systems each of the reference signs is related to. Specifically, "f" indicates a front wheel system and "r" indicates a rear wheel system. For example, among wheel cylinders CW, front wheel cylinders are denoted by CWf (=CWi, CWj) and rear wheel cylinders are denoted by CWr (=CWk, CWl). The subscripts "f" and "r" at the ends of the reference signs may be omitted. When the subscripts "f" and "r" are omitted, a reference sign indicates a general term for each of two brake systems. For example, "CW" represents wheel cylinders in a front and rear brake system.

In a fluid passage, a side close to a reservoir RV (a side away from a wheel cylinder CW) is referred to as an "upper portion", and a side close to the wheel cylinder CW (a side away from the reservoir RV) is referred to as a "lower portion". In addition, in a reflux path (A) of a brake fluid BF, a side close to a discharge portion Qt of a fluid pump HP is referred to as an "upstream side", and a side away from the discharge portion Qt is referred to as a "downstream side".

<Brake Control Device SC According to First Embodiment>

Figure 1:
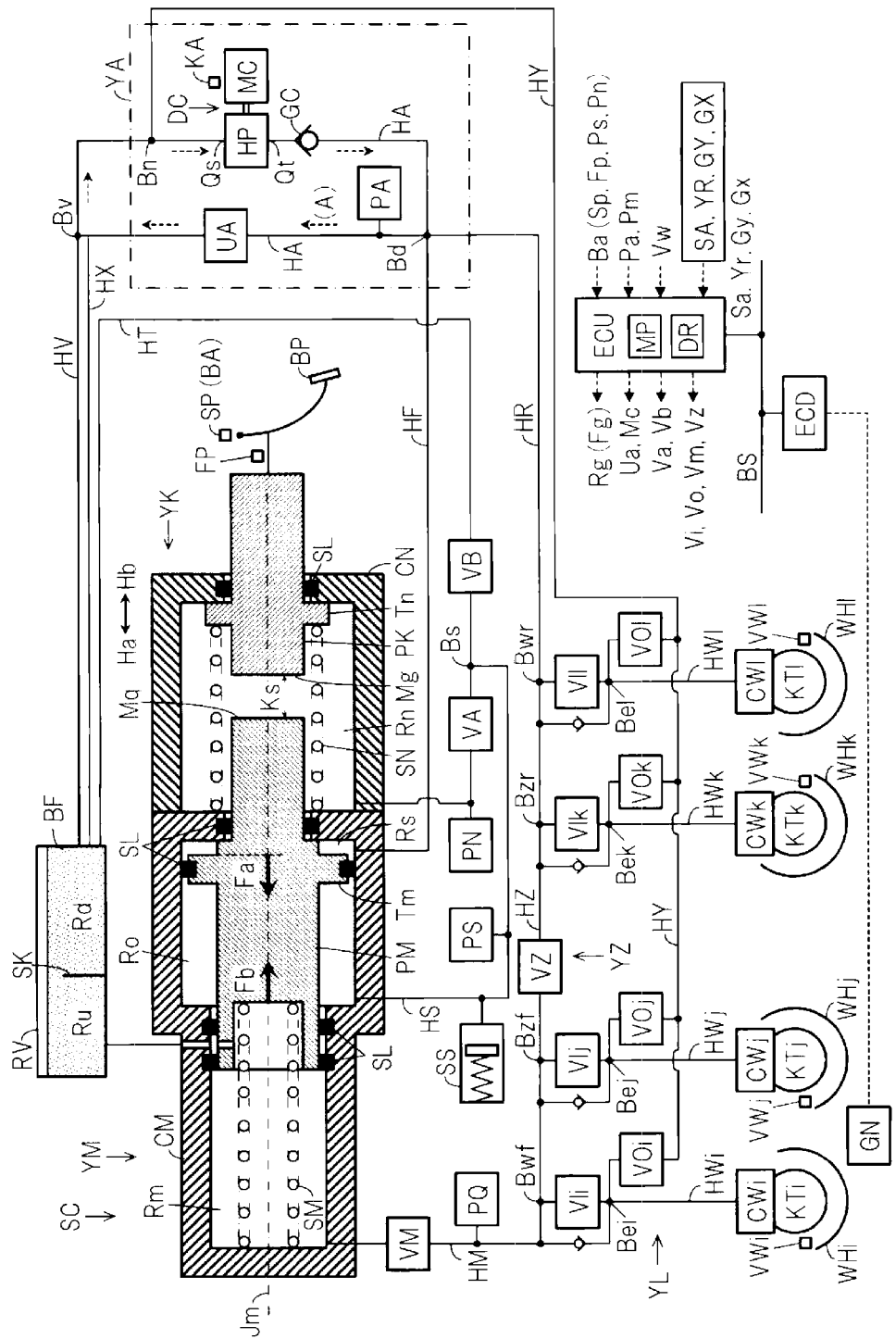
FIG. 1 is an overall configuration diagram illustrating a brake control device SC for a vehicle according to a first embodiment of the disclosure.

A brake control device SC according to a first embodiment of the disclosure will be described with reference to an overall configuration diagram in FIG. 1. In the first embodiment, so-called front and rear type (also referred to as an "H type") fluid passages are adopted as fluid passages in the two systems. Here, a fluid passage is a passage for movement of the brake fluid BF which is a working fluid of the brake control device SC, and corresponds to a brake pipe, a flow passage of a fluid unit, a hose, and the like.

A vehicle is a hybrid vehicle provided with an electric motor GN for driving, or an electric automobile. The electric motor GN for driving also functions as an energy regeneration generator (a power generator). For example, the generator GN is provided connected to front wheels WHi and WHj (=WHf). Alternatively, the generator GN may be provided connected to rear wheels WHk and WHl (=WHr). The generator GN is controlled by a drive controller ECD. The drive controller ECD and a brake controller ECU are connected via a communication bus BS, so that signals can be shared.

The vehicle is provided with a brake operation member BP, a wheel cylinder CW, a wheel speed sensor VW, a steering angle sensor SA, a yaw rate sensor YR, a lateral acceleration sensor GY, and a front-rear acceleration sensor GX.

The brake operation member BP (for example, a brake pedal) is a member operated by a driver to decelerate the vehicle. The brake operation member BP is operated to adjust a brake torque of the wheel WH and generate a brake force at the wheel WH. Specifically, a rotation member (for example, a brake disk) KT is fixed to the wheel WH of the vehicle. A brake caliper is provided to sandwich the rotation member KT.

The brake caliper is provided with the wheel cylinder CW. A pressure (a brake hydraulic pressure) Pw of the brake fluid BF in the wheel cylinder CW is increased to press a friction member (for example, a brake pad) against the rotation member KT. Since the rotation member KT and the wheel WH are fixed to rotate integrally, a friction force generated at this time causes a brake torque (a friction brake force) at the wheel WH.

The wheel WH is provided with the wheel speed sensor VW to detect a wheel speed Vw. The yaw rate sensor YR that detects a yaw rate Yr of the vehicle, the front-rear acceleration sensor GX that detects an acceleration (a front-rear acceleration) Gx in a front-rear direction of the vehicle, and the lateral acceleration sensor GY that detects an acceleration (a lateral acceleration) Gy in a lateral direction of the vehicle are provided on a vehicle body of the vehicle.

<<Brake Control Device SC>>

The brake control device SC includes an operation amount sensor BA, a master unit YM, a pressure adjustment unit YA, a regenerative cooperation unit YK, a lower portion fluid unit YL, a switching unit YZ, and the controller ECU.

The operation amount sensor BA is provided to detect an operation amount Ba of the brake operation member (a brake pedal) BP operated by the driver. An operation displacement sensor SP that detects an operation displacement Sp of the brake operation member BP is provided as the operation amount sensor BA. An operation force sensor FP is provided to detect an operation force Fp of the brake operation member BP. A simulator hydraulic pressure sensor PS is provided as the operation amount sensor BA so as to detect a hydraulic pressure Ps in a stroke simulator SS (a simulator hydraulic pressure). An input hydraulic pressure sensor PN is provided to detect a hydraulic pressure Pn (an input hydraulic pressure) in an input chamber Rn of the regenerative cooperation unit YK. The operation amount sensor BA is a general term for the above-mentioned operation displacement sensor SP and the like, and at least one of the operation displacement Sp, the operation force Fp, the simulator hydraulic pressure Ps, and the input hydraulic pressure Pn is adopted as the brake operation amount Ba. The detected brake operation amount Ba is input into the controller ECU.

[Master Unit YM]

The master unit YM adjusts hydraulic pressures (brake hydraulic pressures) Pwf and Pwr in front wheel and rear wheel cylinders CWf and CWr via a master cylinder chamber Rm. The master unit YM includes a single type master cylinder CM, a master cylinder piston PM, and a master elastic body SM.

The master cylinder CM is a stepped cylinder member (that is, including a small diameter portion and a large diameter portion) including a bottom portion. The master cylinder piston PM (also simply referred to as a "master piston") is a piston member inserted into the master cylinder CM, and has a flange portion Tm. The master cylinder CM and the master piston PM are sealed by a seal SL. The master piston PM can move in conjunction with an operation of the brake operation member BP.

An interior of the master cylinder CM is partitioned into three hydraulic pressure chambers Rm, Rs, and Ro by the master piston PM. The master piston PM can move smoothly along a central axis Jm of the master cylinder CM.

The master cylinder chamber (also simply referred to as a "master chamber") Rm is a hydraulic pressure chamber partitioned by "a small diameter inner peripheral portion and a small diameter bottom portion of the master cylinder CM", and an end portion of the master piston PM. A master cylinder fluid passage HM is connected to the master chamber Rm, and is connected to the front wheel cylinders CWf (=CWi, CWj) via the lower portion fluid unit YL.

The interior of the master cylinder CM is partitioned into the servo hydraulic pressure chamber (also simply referred to as a "servo chamber") Rs and the reaction force hydraulic pressure chamber (also simply referred to as a "reaction force chamber") Ro by the flange portion Tm of the master piston PM. The servo chamber Rs is a hydraulic pressure chamber partitioned by "a large diameter inner peripheral portion and a large diameter bottom portion of the master cylinder CM", and the flange portion Tm of the master piston PM. The master chamber Rm and the servo chamber Rs are provided to face each other with the flange portion Tm interposed therebetween. A front wheel servo fluid passage HF is connected to the servo chamber Rs, and an adjustment hydraulic pressure Pa is introduced from the pressure adjustment unit YA into the servo chamber Rs.

The reaction force chamber Ro is a hydraulic pressure chamber partitioned by the large diameter inner peripheral portion and a stepped portion of the master cylinder CM, and the flange portion Tm of the master piston PM. The reaction force chamber Ro is positioned and interposed between the master hydraulic pressure chamber Rm and the servo hydraulic pressure chamber Rs in a direction of the central axis Jm of the master cylinder CM. Therefore, when a volume of the servo chamber Rs is increased, a volume of the reaction force chamber Ro is reduced. Conversely, when a volume of the servo chamber is reduced, a volume of the reaction force chamber is increased. A simulator fluid passage HS is connected to the reaction force chamber Ro. The reaction force chamber Ro adjusts a fluid amount of the brake fluid BF in the input chamber Rn.

The master elastic body (for example, a compression spring) SM is provided between an end portion of the master cylinder CM located at the small diameter bottom portion and an end portion of the master piston PM. The master elastic body SM presses the master piston PM in a direction of the central axis Jm of the master cylinder CM. When the brake force is F not generated, the master piston PM is in contact with a large diameter bottom portion of the master cylinder CM. A position of the master piston PM in this state is referred to as an "initial position of the master unit YM".

The master reservoir, which is an atmospheric pressure reservoir and also simply referred to as a reservoir, RV is a working fluid tank, and stores the brake fluid BF. A lower portion of the reservoir RV is partitioned into a master reservoir chamber Ru connected to the master cylinder chamber Rm and a pressure adjustment reservoir chamber Rd connected to the pressure adjustment unit YA (particularly a suction portion Qs of the fluid pump HP) by a partition plate SK. In a state in which the reservoir RV is filled with the brake fluid BF, a fluid level of the brake fluid BF is higher than a height of the partition plate SK. Therefore, the brake fluid BF can freely move between the master reservoir chamber Ru and the pressure adjustment reservoir chamber Rd beyond the partition plate SK. On the other hand, when an amount of the brake fluid BF in the reservoir RV decreases and a fluid level of the brake fluid BF is lower than the height of the partition plate SK, a fluid in the master reservoir chamber Ru and a fluid in the pressure adjustment reservoir chamber Rd are independent of each other.

If the master cylinder CM is provided with a through hole and the brake operation member BP is not operated, the master chamber Rm is connected to the master reservoir (the atmospheric pressure reservoir) RV through the through hole. That is, when the master piston PM is at the above-mentioned initial position, the master chamber Rm is in communication with the reservoir RV. When the brake operation member BP is operated and the master piston PM is moved in a forward direction Ha, a communication state between the master chamber Rm and the reservoir RV is cut off. Then, when the master piston PM is further moved in the forward direction Ha, a master cylinder hydraulic pressure Pm is increased from "0 (an atmospheric pressure)".

An inner pressure (which is a "master cylinder hydraulic pressure" and also referred to as a "master hydraulic pressure") Pm of the master chamber Rm applies, to the master piston PM, a biasing force Fb (referred to as a "rearward force") in a rearward direction Hb along the central axis Jm. An inner pressure (that is, the introduced adjustment hydraulic pressure Pa) of the servo chamber Rs applies, to the master piston PM, a biasing force Fa (referred to as a "forward force") in the forward direction Ha opposite to the rearward force Fb. That is, on the master piston PM, the forward force Fa applied by the hydraulic pressure (the adjustment hydraulic pressure) Pa in the servo chamber Rs and the rearward force Fb applied by the hydraulic pressure (the master hydraulic pressure) Pm in the master chamber Rm are opposite to each other (face each other) in the direction of the central axis Jm and are statically balanced. That is, when the master hydraulic pressure Pm is maintained constant, the forward force Fa and the rearward force Fb are balanced and "Fa=Fb". When the master hydraulic pressure Pm is increased, the adjustment hydraulic pressure Pa is increased and "Fa>Fb". On the other hand, when the master hydraulic pressure Pm is reduced, the adjustment hydraulic pressure Pa is reduced and "Fa<Fb". The master cylinder fluid passage HM is connected to the master chamber Rm. The master cylinder fluid passage HM is provided with a master cylinder hydraulic pressure sensor PQ at a position lower than a master cylinder valve VM which will be described later so as to detect the master hydraulic pressure Pm.

[Pressure Adjustment Unit YA]

The pressure adjustment unit YA adjusts the hydraulic pressure Pw in the wheel cylinder CW. The pressure adjustment unit YA includes an electric pump DC, a check valve GC, a pressure adjustment valve UA, and an adjustment hydraulic pressure sensor PA.

The electric pump DC includes an electric motor MC and the fluid pump HP, and the fluid pump HP and the electric motor MC are rotated integrally. In the fluid pump HP, the suction port Qs is connected to a first reservoir fluid passage HV, and the discharge port Qt is connected to one end of a pressure adjustment fluid passage HA. The other end of the pressure adjustment fluid passage HA is connected to a second reservoir fluid passage HX via the pressure adjustment valve UA. The first and the second reservoir fluid passages HV and HX are connected to the reservoir RV. The pressure adjustment fluid passage HA is provided with the check valve GC.

The pressure adjustment fluid passage HA is provided with the pressure adjustment valve UA. The pressure adjustment valve UA is a linear electromagnetic valve (a proportional valve or a differential pressure valve) in which a valve opening amount (a lift amount) is continuously controlled in response to an energized state (for example, a supply current). The pressure adjustment valve UA is controlled by the controller ECU in response to a drive signal Ua. A normal open electromagnetic valve is adopted as the pressure adjustment valve UA.

When the electric pump DC is driven, a reflux path (A) of the brake fluid BF is formed to be "HV→HP→GC-→UA→HX→RV→HV". In other words, the reflux path (A) of the brake fluid BF includes the fluid pump HP, the pressure adjustment valve UA, and the reservoir RV. The pressure adjustment valve UA may be connected to the first reservoir fluid passage HV at a position Bv. In this case, the reflux path (A) becomes "HV→HP→GC→UA→HV".

When the pressure adjustment valve UA is in a fully open state (when not energized, since the pressure adjustment valve UA is a normal open type), the hydraulic pressure (an adjustment hydraulic pressure) Pa in a pressure adjustment fluid passage HA is approximate to "0 (an atmospheric pressure)". When an energization amount to the pressure adjustment valve UA is increased and the reflux path (A) is narrowed by the pressure adjustment valve UA, a hydraulic pressure (the hydraulic pressure Pa between the fluid pump HP and the pressure adjustment valve UA) upstream of the pressure adjustment valve UA in the pressure adjustment fluid passage HA is increased from "0". That is, the adjustment hydraulic pressure Pa is adjusted by the pressure adjustment valve UA so as to increase from "0 (an atmospheric pressure)". The pressure adjustment unit YA is provided with the adjustment hydraulic pressure sensor PA so as to detect the adjustment hydraulic pressure Pa. Since specifications (such as a pressure receiving area of the master piston PM) of the master unit YM are known, the mass cylinder hydraulic pressure sensor PQ may be used instead of the adjustment hydraulic pressure sensor PA.

The pressure adjustment fluid passage HA is branched to the front wheel servo fluid passage HF at a position Bd between the fluid pump HP and the pressure adjustment valve UA, and is connected to the servo chamber Rs. Therefore, the brake fluid BF at the adjustment hydraulic pressure Pa is introduced (supplied) into the servo chamber Rs. The adjustment hydraulic pressure Pa is converted to the forward force Fa in the forward direction Ha of the master piston PM, and then the master hydraulic pressure Pm in the master chamber Rm increases. That is, the hydraulic pressures (the front wheel brake hydraulic pressures) Pwf in the front wheel cylinders CWi and CWj (=CWf) are adjusted by the master unit YM via the master cylinder fluid passage HM. On the other hand, the hydraulic pressures (the rear wheel brake hydraulic pressures) Pwr in the rear wheel cylinders CWk and CWl (=CWr) are adjusted, via a rear wheel servo fluid passage HR, by directly supplying the brake fluid BF that was adjusted to the adjustment hydraulic pressure Pa. Here, similar to the front wheel servo fluid passage HF, the rear wheel servo fluid passage HR is branched from the pressure adjustment fluid passage HA at the position Bd.

[Regenerative Cooperation Unit YK]

A cooperation control (referred to as a "regenerative cooperation control") in friction braking and regenerative braking is achieved by the regenerative cooperation unit YK (corresponding to an "input unit"). For example, a state in which the brake hydraulic pressure Pw is not generated while the brake operation member BP is operated is formed by the regenerative cooperation unit YK. The regenerative cooperation unit (the input unit) YK includes an input cylinder CN, an input piston PK, an input elastic body SN, a first on-off valve VA, a second on-off valve VB, the stroke simulator SS, the simulator hydraulic pressure sensor PS, and the input hydraulic pressure sensor PN.

The input cylinder CN is a cylinder member having a bottom portion and fixed to the master cylinder CM. The input piston PK is a piston member inserted into the input cylinder CN. The input piston PK is mechanically connected to the brake operation member BP via a clevis (a U-shaped link) so as to interlock with the brake operation member BP. The input piston PK is provided with a flange portion Tn. The input elastic body (for example, a compression spring) SN is provided between a mounting surface on which the input cylinder CN is mounted to the master cylinder CM and the flange portion Tn of the input piston PK. The input elastic body SN presses the flange portion Tn of the input piston PK against the bottom portion of the input cylinder CN in the direction of the central axis Jm.

When the brake force F is not generated, the stepped portion of the master piston PM is in contact with the large diameter bottom portion of the master cylinder CM, and the flange portion Tn of the input piston PK is in contact with the bottom portion of the input cylinder CN. the braking force F is not generated, a gap Ks between an end surface Mq of the master piston PM and an end surface Mg of the input piston PK inside the input cylinder CN is set to a predetermined distance ks (referred to as an "initial gap") (that is, "Ks=ks"). That is, the master piston PM and the input piston PK are separated by the predetermined distance ks when the pistons PM and PK are located at positions (referred to as "initial positions" of the pistons) furthermost in the rearward direction Hb (a direction opposite to the forward direction Ha) (that is, when not braking). Here, the predetermined distance ks corresponds to a maximum value of a regenerative amount Rg. When the regenerative cooperation control is performed, the gap (also referred to as a "separation displacement") Ks is controlled (adjusted) by the adjustment hydraulic pressure Pa.

When the brake operation member BP is depressed from a state of "Ba=0", the input piston PK is moved from the initial position of the input piston PK in the forward direction Ha (a direction in which the brake hydraulic pressure Pw increases). At this time, if the adjustment hydraulic pressure Pa is maintained at "0", since the master piston PM remains at the initial position, the gap Ks (the distance between the end surface Mg and the end surface Mq) gradually decreases as the input piston PK moves forward. On the other hand, when the adjustment hydraulic pressure Pa is increased from "0", the master piston PM is moved from the initial position of the master piston PM in the forward direction Ha. Therefore, the gap Ks can be adjusted by the adjustment hydraulic pressure Pa independently of the brake operation amount Ba in a range of "0≤Ks≤ks". That is, by adjusting the adjustment hydraulic pressure Pa, the gap Ks between the input piston PK and the master piston PM is adjusted, and the regenerative cooperation control is achieved.

The input chamber Rn of the regenerative cooperation unit YK (the input unit) and the reaction force chamber Ro of the master unit YM are connected by the simulator fluid passage HS. The simulator fluid passage HS is provided with the first ON-OFF valve VA. The first on-off valve VA is a normal close electromagnetic valve (an on-off valve) having an ON position and an OFF position. A third reservoir fluid passage HT is connected to a position Bs between the first on-off valve VA of the simulator fluid passage HS and the reaction force chamber Ro. The third reservoir fluid passage HT is provided with the second on-off valve VB. The second on-off valve VB is a normal open electromagnetic valve (an on-off valve) having an ON position and an OFF position. The first and second on-off valves VA and VB are controlled by the controller ECU based on drive signals Va and Vb. When the brake control device SC is activated, energization to the first and second on-off valves VA and VB is started. Then, the first on-off valve VA is set to the ON position and the second on-off valve VB is set to the OFF position.

The stroke simulator SS (also simply referred to as a "simulator") is connected to the simulator fluid passage HS between the first on-off valve VA and the reaction force chamber Ro. In other words, the input chamber Rn of the regenerative cooperation unit YK is connected to the simulator SS by the simulator fluid passage HS. During the regenerative cooperation control, the first on-off valve VA is set to the ON position and the second on-off valve VB is set to the OFF position. The second on-off valve VB is set to the OFF position, so that a flow path to the reservoir RV is cut off in the third reservoir fluid passage HT. Therefore, the brake fluid BF moves from the input chamber Rn of the input cylinder CN to the simulator SS. Since a force for preventing inflow of the brake fluid BF is applied to a piston of the simulator SS by an elastic body, the operation force Fp is generated when the brake operation member BP is operated.

The third reservoir fluid passage HT is connected to the reservoir RV. A part of the third reservoir fluid passage HT can be shared with the first and second reservoir fluid passages HV and HX. However, it is desirable that the first and second reservoir fluid passages HV and HX and the third reservoir fluid passage HT are separately connected to the reservoir RV. The fluid pump HP suctions the brake fluid BF from the reservoir RV via the first reservoir fluid passage HV. At this time, air bubbles may be mixed in the first reservoir fluid passage HV. Therefore, the third reservoir fluid passage HT is directly connected to the reservoir RV so as to prevent the air bubbles from mixing into the input cylinder CN and the like.

The simulator fluid passage HS between the first on-off valve VA and the reaction force chamber Ro is provided with the simulator hydraulic pressure sensor PS so as to detect the hydraulic pressure Ps in the simulator SS (referred to as a "simulator hydraulic pressure"). The simulator fluid passage HS between the first on-off valve VA and the input chamber Rn is provided with the input hydraulic pressure sensor PN so as to detect the hydraulic pressure Pn in the input chamber Rn (referred to as an "input hydraulic pressure"). Each of the simulator hydraulic pressure sensor PS and the input hydraulic pressure sensor PN is one of the above-mentioned brake operation amount sensors BA. Detected hydraulic pressures Ps and Pn are input into the controller ECU as the brake operation amount Ba. Since "Ps=Pn" when the first and second on-off valves VA and VB are energized, one of the simulator hydraulic pressure sensor PS and the input hydraulic pressure sensor PN may be omitted.

[Lower Portion Fluid Unit YL]

The lower portion fluid unit YL (corresponding to a "fluid unit" and also referred to as a "hydraulic modulator") separately adjusts four-wheel independent brake hydraulic pressures Pw, such as an anti-skid control and a vehicle stability control. The lower portion fluid unit YL includes inlet valves VI and outlet valves VO.

The master unit YM (particularly, the master chamber Rm of the master cylinder CM) and the lower portion fluid unit YL are connected by the master cylinder fluid passage HM. The master cylinder fluid passage HM is branched into front wheel cylinder fluid passages HWi, HWj (=HWf) at a position Bwf lower than the master cylinder valve VM, and is connected to the front wheel cylinders CWi and CWj (=CWf). Similarly, the rear wheel servo fluid passage HR is branched into rear wheel cylinder fluid passages HWk, HWl (=HWr) at a position Bwr, and is connected to the rear wheel cylinders CWk and CWl (=CWr). Inlet valves VIi to VIl are provided at the wheel cylinder fluid passages HWi to HWl, respectively. Each of the inlet valves VI is a normal open electromagnetic valve (an on-off valve) having an ON position and an OFF position. Each of the inlet valves VI may be a normal open linear valve. The inlet valves VI are controlled by the controller ECU based on a drive signal Vi.

Positions Bei to Bel lower than the inlet valves VIi to VIl in the wheel cylinder fluid passages HWi to HWl are connected to a position Bn (that is, the suction portion Qs of the fluid pump HP) of the first reservoir fluid passage HV via a return fluid passage HY. Outlet valves VOi to Vol are provided between the positions Bei to Bel lower than the inlet valves VIi to VIL and the return fluid passage HY. Each of the outlet valves VO is a normal close electromagnetic valve (an on-off valve) having an ON position and an OFF position. The outlet valves VO are controlled by the controller ECU based on a drive signal Vo. In the wheel cylinder fluid passages HW, the inlet valves VI, the outlet valves VO, and the return fluid passage HY have the same configuration.

[Switching Unit YZ]

For the wheel cylinder CW, the switching unit YZ switches between (that is, selectively achieves) a state (referred to as a "first state") in which the master hydraulic pressure Pm is supplied from the single master cylinder CM and a state (referred to as a "second state") in which the adjustment hydraulic pressure Pa is directly supplied from the pressure adjustment unit YA. The first state corresponds to a case of normal braking including the regenerative cooperation control, and the second state corresponds to a case where the anti-skid control, the vehicle stability control, and the like (a slip control to be described later) are operated. The switching unit YZ includes the master cylinder valve VM and a switching valve VZ.

The master cylinder valve VM is provided at the master cylinder fluid passage HM at an outlet of the master chamber Rm of the master cylinder CM. In other words, the master chamber Rm is connected to the master cylinder fluid passage HM via the master cylinder valve VM. Communication and non-communication between the master chamber Rm and the master cylinder fluid passage HM are switched by the master cylinder valve VM. The master cylinder valve VM is a normal open electromagnetic valve (an on-off valve) having an ON position and an OFF position. The master cylinder valve VM is controlled by the controller ECU based on a drive signal Vm.

The master cylinder fluid passage HM is connected to the rear wheel servo fluid passage HR via a communication fluid passage HZ. That is, the communication fluid passage HZ is provided between a position Bzr of the rear wheel servo fluid passage HR and a position Bzf of the master cylinder fluid passage HM. The communication fluid passage HZ is provided with the switching valve VZ. The switching valve VZ is a normal close electromagnetic valve (an on-off valve) having an ON position and an OFF position. "Communication and non-communication" between the front wheel and rear wheel servo fluid passages HF and HR (that is, the pressure adjustment unit YA and the servo chamber Rs) and the master cylinder fluid passage HM are switched by the switching valve VZ. The switching valve VZ is controlled by the controller ECU based on a drive signal Vz.

In the first state, the master cylinder valve VM and the switching valve VZ are de-energized. That is, the master cylinder valve VM is set to the ON position, and the switching valve VZ is set to the OFF position. When the switching valve VZ is set to the OFF position, the master cylinder fluid passage HM and the front wheel and rear wheel servo fluid passages HF and HR (the fluid passages connected to the pressure adjustment unit YA and the servo chamber Rs) are fluidically separated via the master unit YM (particularly the master piston PM). At this time, the adjustment hydraulic pressure Pa is supplied to the servo chamber Rs, and the brake fluid BF is pressure-fed from the master chamber Rm toward the front wheel cylinder CWf by the master hydraulic pressure Pm. When a pressure receiving area rs of the servo chamber Rs and a pressure receiving area rm of the master chamber Rm are the same, "Pm=Pa" is output to the front wheel cylinder CWf. The adjustment hydraulic pressure Pa is directly supplied to the rear wheel cylinder CWr. The first state is achieved (selected) during normal braking including the regenerative cooperation control in which the slip control is not performed.

In the second state, the master cylinder valve VM and the switching valve VZ are energized. That is, the master cylinder valve VM is set to the OFF position, and the switching valve VZ is set to the ON position. When the master cylinder valve VM is set to the OFF position, the master chamber Rm is in a fluid lock (containment of the brake fluid BF) state, so that the master piston PM is not moved, and the brake fluid BF does not flow into the servo chamber Rs. At this time, since the switching valve VZ is set to the ON position, the adjustment hydraulic pressure Pa that was adjusted by the pressure adjustment valve UA is supplied to the master cylinder fluid passage HM (finally, the front wheel cylinder CWf) via the communication fluid passage HZ (that is, the switching unit YZ). The adjustment hydraulic pressure Pa is directly supplied to the rear wheel cylinder CWr. The second state is achieved (selected) when the slip control is performed.

[Controller ECU]

In the controller ECU, the anti-skid control is performed based on the wheel speed Vw. Here, the anti-skid control prevents an excessive deceleration slip (that is, a tendency to lock wheels) of the wheels WH. Specifically, a vehicle body speed Vx is calculated based on four wheel speeds Vw. The wheel slip speed Sp is calculated based on a deviation between the wheel speed Vw and the vehicle body speed Vx, and the wheel speed Vw is time-differentiated to calculate a wheel acceleration dV. In a relationship between the wheel slip speed Sp, the wheel acceleration dV, and thresholds of the wheel slip speed Sp and the wheel acceleration dV, the lower portion fluid unit YL is controlled to reduce, increase, or maintain the brake hydraulic pressures Pw.

In addition, the controller ECU performs the vehicle stability control based on the yaw rate Yr. The vehicle stability control prevents the vehicle from skidding and stabilizes a yaw motion. Specifically, a normative value of a vehicle behavior is determined based on a steering angle Sa. Parallelly, an actual value of the vehicle behavior is calculated based on the yaw rate Yr and the lateral acceleration Gy. Then, the brake hydraulic pressures Pw are independently and separately controlled based on a deviation between the normative value and the actual value. At least one of the anti-skid control and the vehicle stability control is referred to as the "slip control". That is, the slip control is a general term for a separate control of each wheel such as the anti-skid control and the vehicle stability control.

The pressure adjustment unit YA and the regenerative cooperation unit YK are controlled by the controller ECU to perform the regenerative cooperation control and achieve deceleration of the vehicle according to the brake operation amount Ba. The pressure adjustment unit YA, the regenerative cooperation unit YK, the lower portion fluid unit YL, and the switching unit YZ are controlled to perform the slip control (at least one of the anti-skid control and the vehicle stability control). That is, the electric motor MC and the electromagnetic valves UA, VA, VB, VM, VI, VO, and VZ are controlled by the controller ECU. Specifically, the controller ECU calculates a drive signal Mc for controlling the electric motor MC. Similarly, the controller ECU calculates the drive signals Ua, Va, Vb, Vm, Vi, Vo, Vz for controlling various electromagnetic valves UA, VA, VB, VM, VI, VO, and VZ. The electric motor MC and the electromagnetic valves UA, VA, VB, VM, VI, VO, and VZ are controlled based on these drive signals (Mc and the like).

The brake control device SC according to the first embodiment is a brake-by-wire device capable of achieving the regenerative cooperation control. The regenerative cooperation control controls a regenerative brake force generated by the regenerative generator GN and a friction brake force generated by the brake hydraulic pressure Pw in cooperation. During normal braking including the regenerative cooperation control, members related to the master cylinder fluid passage HM (the master chamber Rm, the front wheel cylinders CWf, and the like), members related to the servo chamber Rs (the front wheel and rear wheel servo fluid passages HF and HR, the pressure adjustment fluid passage HA, the rear wheel cylinders CWr, and the like), and members related to the simulator SS (the reaction force chamber Ro, the input chamber Rn, the simulator fluid passage HS, and the like) are fluidically separated from each other in the brake control device SC. Here, a "fluidical separation" refers to a state in which a force (that is, a hydraulic pressure) is transmitted while the brake fluid BF does not move.

Specifically, the members related to the master cylinder fluid passage HM (the master chamber Rm, the front wheel cylinders CWf, and the like) and the members related to the servo chamber Rs (the servo fluid passages HF and HR, the rear wheel cylinders CWr, and the like) are fluidically separated by the master piston PM. The members related to the servo chamber Rs and the members related to the simulator SS (the reaction force chamber Ro and the like) are fluidically separated by the master piston PM (particularly, the flange portion Tm) and the large diameter bottom portion of the master cylinder CM. That is, the three hydraulic pressure chambers Rm (=HM, CWf), Rs (=HF, HR, YA, CWr), and Ro (=HS, SS) are independent of each other, and the brake fluid BF does not move therebetween.

In the brake control device SC, the simulator SS is not directly affected by a fluctuation of hydraulic pressures from the master chamber Rm (=HM, CWf) and the servo chamber Rs (=HF, HR, CWr). Although the simulator SS is affected by a fluctuation of the hydraulic pressure Pa via the master piston PM or the like, the fluctuation is attenuated by friction resistance of the seal SL or the like, elasticity in a fluid passage, narrowing by the first on-off valve VA, and the like. Therefore, the simulator SS is less likely to be affected by a pulsation of the fluid pump HP, and a fluctuation of the brake operation force Fp can be reduced. As a result, a suitable operation characteristic of the brake operation member BP (a relationship between the operation displacement Sp and the operation force Fp) is achieved.

Generally, a failure (breakage) in the brake control device SC is determined based on a relationship between the operation displacement Sp and the brake hydraulic pressure Pw (=Pm or Pa). However, even when the determination is not appropriately performed, since the members related to the master chamber Rm and the members related to the servo chamber Rs are fluidically separated by the master piston PM, an amount of the brake fluid BF discharged to an outside of the device due to the failure is limited. That is, even when any one of the members is broken and the determination is not sufficiently performed, the worst situation is that an amount of the brake fluid BF in a reservoir chamber (a fluid reservoir such as Ru) corresponding to a broken member is insufficient. As a result, reliability of the brake control device SC can be improved.

Further, the brake control device SC is provided with the switching unit YZ capable of selectively achieving "a first state in which the master chamber Rm and the front wheel cylinders CWf are in a communication state and the front wheel cylinders CWf and the rear wheel servo fluid passage HR (that is, the servo chamber Rs, the pressure adjustment fluid passage HA, and the like) are in a non-communication state" and "a second state in which the master chamber Rm and the front wheel cylinders CWf are in a non-communication state and the front wheel cylinders CWf and the rear wheel servo fluid passage HR (Rs, HA, and the like) are in a communication state". When the slip control (at least one of the anti-skid control and the vehicle stability control) is not performed during normal braking, the master cylinder valve VM is controlled to be at the ON position and the switching valve VZ is controlled to be at the OFF position, so that the switching unit YZ achieves the first state. The front wheel brake hydraulic pressures Pwf of the front wheel cylinders CWf are adjusted by the master chamber Rm, and the rear wheel brake hydraulic pressures Pwr of the rear wheel cylinders CWr are adjusted by the adjustment hydraulic pressure Pa.

On the other hand, when the slip control is performed, the master cylinder valve VM is set to the OFF position and the switching valve VZ is set to the ON position, so that the switching unit YZ achieves the second state. The master cylinder valve VM is set to the OFF position, so that the master chamber Rm and the front wheel cylinders CWf are cut off and the three hydraulic pressure chambers Rm, Ro, and Rs are brought into a fluid lock state. Since the brake fluid BF does not flow into the servo chamber Rs, the brake fluid BF is supplied to the front wheel and rear wheel cylinders CWf and CWr via the communication fluid passage HZ and the switching valve VZ, and the front wheel and rear wheel brake hydraulic pressures Pwf and Pwr are respectively increased by the inlet valves VI. That is, the brake hydraulic pressures Pwf and Pwr are directly increased by the pressure adjustment unit YA. When the front wheel and rear wheel brake hydraulic pressures Pwf and Pwr are separately reduced, the inlet valves VI are set to the OFF position and the outlet valves VO are set to the ON position in the fluid unit YL, so that the brake fluids BF in the front wheel and rear wheel cylinders CWf and CWr are discharged into the suction portion Qs of the fluid pump HP (that is, the reservoir RV) via the return fluid passage HY. When the front wheel and rear wheel brake hydraulic pressures Pwf and Pwr are separately maintained, the inlet valves VI and the outlet valves VO are OFF. The brake control device SC is a so-called discharge type. It is not necessary to add an electric pump separate from the electric pump DC in order to perform the slip control. Therefore, the brake control device SC can be simplified, and a size and a weight can be reduced.

<Pressure Adjustment Control Processing>

Figure 2:
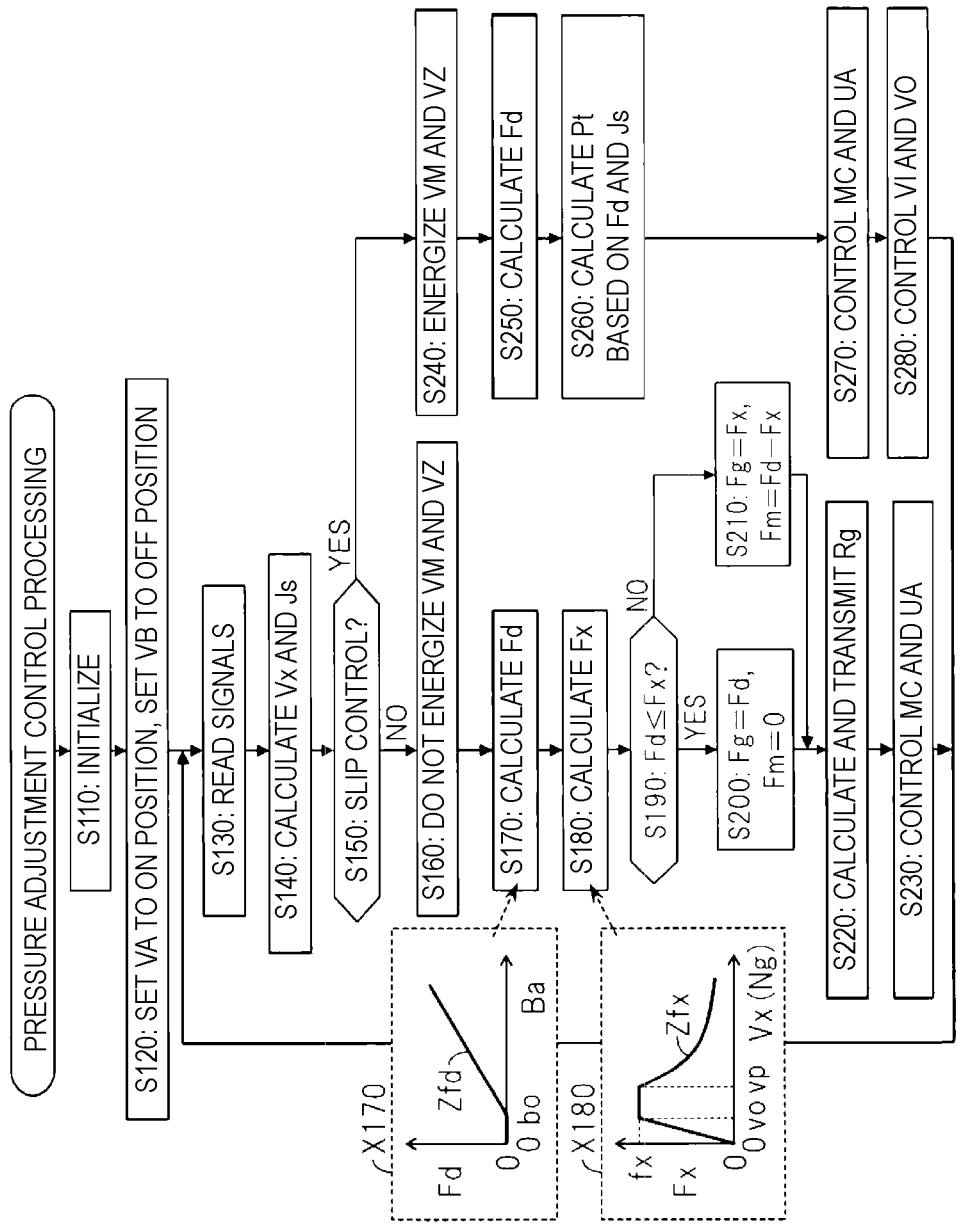
FIG. 2 is a flowchart illustrating pressure adjustment control processing.

Pressure adjustment control processing including the regenerative cooperation control and the slip control will be described with reference to a control flow diagram in FIG. 2. The "pressure adjustment control" is a drive control of the electric motor MC and the electromagnetic valves UA, VA, VB, VM, VI, VO, and VZ for adjusting the adjustment hydraulic pressure Pa. An algorithm of the control is programmed into a microprocessor MP in the controller ECU.

In step S110, the brake control device SC is initialized. In step S110, an initial diagnosis for each component is performed. In step S120, the normal close first on-off valve VA and the normal open second on-off valve VB are energized. That is, when an activation switch of the device is turned on, the first on-off valve VA is set to the ON position, and the second on-off valve VB is set to the OFF position.

In step S130, various sensor signals (detection values) are read. The brake operation amount Ba (Sp, Fp, Ps, Pn), the adjustment hydraulic pressure Pa, the master hydraulic pressure Pm, the wheel speed Vw, the steering angle Sa, the yaw rate Yr, the front-rear acceleration Gx, and the lateral acceleration Gy are read. The operation amount Ba is detected by the operation amount sensor BA (the operation displacement sensor SP, the operation force sensor FP, the input hydraulic pressure sensor PN, the simulator hydraulic pressure sensor PS, and the like). The adjustment hydraulic pressure Pa and the master hydraulic pressure Pm are detected by the adjustment hydraulic pressure sensor PA and the master cylinder hydraulic pressure sensor PQ. The wheel speed Vw, the steering angle Sa, the yaw rate Yr, the front-rear acceleration Gx, and the lateral acceleration Gy are respectively detected by the wheel speed sensor VW, the steering angle sensor SA, the yaw rate sensor YR, the front-rear acceleration sensor GX, and the lateral acceleration sensor GY.

In step S140, the vehicle body speed Vx and a slip state quantity Js are calculated. The vehicle body speed Vx is calculated based on the wheel speed Vw. The slip state quantity Js is a state quantity (a state variable) in the slip control. When the slip control is the anti-skid control, the slip state quantity Js is calculated based on the wheel slip speed Sp (a speed difference between the wheel speed Vw and the vehicle body speed Vx) and the wheel acceleration dV (a time differential value of the wheel speed Vw). When the slip control is the vehicle stability control, the slip state quantity Js is determined based on a deviation between the normative value and the actual value of a state quantity of a vehicle behavior. Here, the normative value is calculated based on the steering angle Sa, and the actual value is calculated based on the yaw rate Yr and the lateral acceleration Gy.

In step S150, it is determined "whether to perform the slip control" based on the slip state quantity Js. Specifically, when the slip state quantity Js exceeds a predetermined quantity jx, the slip control is performed. The predetermined quantity jx is a preset constant, and is a threshold at which the slip control is performed. When the determination in step S150 is NO, the processing proceeds to step S160. When the determination in step S150 is YES, the processing proceeds to step S240.

Processing in steps S160 to S230 is processing during normal braking including the regenerative cooperation control. In step S160, a non-energization state of the normal open master cylinder valve VM and the normal close switching valve VZ is maintained. That is, the master cylinder valve VM is set to the ON position and the switching valve VZ is set to the OFF position.

In step S170, as shown in a block X170, a required brake force Fd is calculated based on the operation amount Ba. The required brake force Fd is a target value of a total brake force F acting on the vehicle, and is a brake force obtained by combining "a friction brake force Fm generated by the brake control device SC" with "a regenerative brake force Fg generated by the generator GN". According to a calculation map Zfd, the required brake force Fd is determined to be "0" when the operation amount Ba is in a range from "0" to a predetermined value bo, and when the operation amount Ba is equal to or larger than the predetermined value bo, the required brake force Fd is calculated to monotonically increase from "0" as the operation amount Ba increases.

In step S180, as shown in a block X180, a maximum value of a regenerative brake force (referred to as a "maximum regenerative force") Fx is calculated based on the vehicle body speed Vx and a calculation map Zfx. A regeneration amount of the generator GN is limited by specifications of a power transistor (such as IGBT) of the drive controller ECD and charging acceptability of a battery. For example, the regeneration amount of the generator GN is controlled to be predetermined power (electrical energy per unit time). Since electric power (power) is constant, a regenerative torque around a wheel axis generated by the generator GN is inversely proportional to a rotation speed of the wheel WH (that is, the vehicle body speed Vx). When a rotation speed Ng of the generator GN is reduced, the regeneration amount is reduced. The regeneration amount has an upper limit value.

In the calculation map Zfx for the maximum regenerative force Fx, the maximum regenerative force Fx is set to increase in accordance with an increase in the vehicle body speed Vx when the vehicle body speed Vx is equal to or larger than "0" and smaller than a first predetermined speed vo. The maximum regenerative force Fx is determined to be an upper limit value fx when the vehicle body speed Vx is in a range equal to or larger than the first predetermined speed vo and smaller than a second predetermined speed vp. The maximum regenerative force Fx is set to decrease in accordance with an increase in the vehicle body speed Vx when the vehicle body speed Vx is equal to or larger than the second predetermined speed vp. For example, in a decrease characteristic of the maximum regenerative force Fx (a characteristic when "Vx≥vp"), a relationship between the vehicle body speed Vx and the maximum regenerative force Fx is represented by a hyperbola (that is, regenerative force is constant). Here, each of the predetermined values vo and vp is a preset constant. In the calculation map Zfx, the rotation speed Ng of the generator GN may be adopted instead of the vehicle body speed Vx.

In step S190, it is determined "whether the required brake force Fd is equal to or smaller than the maximum regenerative force Fx" based on the required brake force Fd and the maximum regenerative force Fx. That is, it is determined whether the brake force Fd required by the driver can be provided by the regenerative brake force Fg only. When "Fd≤ Fx", that is, YES in step S190, the processing proceeds to step S200. On the other hand, when "Fd>Fx", that is, NO in step S190, the processing proceeds to step S210.

In step S200, the regenerative brake force Fg is determined to be the required brake force Fd (that is, "Fg=Fd"). In step S200, a target friction brake force Fm is calculated to be "0". The target friction brake force Fm is a target value of a brake force to be provided by friction braking. In this case, the required brake force Fd to decelerate the vehicle is provided by regenerative braking only without adopting friction braking.

In step S210, the regenerative brake force Fg is determined to be the maximum regenerative force Fx (that is, "Fg=Fx"). In step S210, the target friction brake force Fm is calculated based on the required brake force Fd and the maximum regenerative force Fx. Specifically, the target friction brake force Fm is determined by subtracting the maximum regenerative force Fx from the required brake force Fd (that is, "Fm=Fd−Fx"). That is, the regenerative brake force Fg (=Fx) is not sufficient to provide the required brake force Fd and the required brake force Fd is compensated by the target friction brake force Fm.

In step S220, the regeneration amount Rg is calculated based on the regenerative brake force Fg. The regeneration amount Rg is a target value of a regeneration amount of the generator GN. The regeneration amount Rg is transmitted from the brake controller ECU to the drive controller ECD via the communication bus BS. Then, the generator GN is controlled by the drive controller ECD so as to provide the target regeneration amount Rg.

In step S230, the electric motor MC and the pressure adjustment valve UA are controlled. Specifically, first, a target hydraulic pressure Pt is calculated based on the target friction brake force value Fm. The target hydraulic pressure Pt is a target value of the adjustment hydraulic pressure Pa. The target friction brake force Fm is converted into a hydraulic pressure to determine the target hydraulic pressure Pt. Then, the electric motor MC is driven, and the reflux path (A) of the brake fluid BF including the fluid pump HP is formed. A feedback control of the pressure adjustment valve UA is performed based on the target hydraulic pressure Pt and the adjustment hydraulic pressure (a detection value of the adjustment hydraulic pressure sensor PA) Pa so as to bring the adjustment hydraulic pressure Pa to be close to and coincide with the target hydraulic pressure Pt. As described above, the electromagnetic valves VM, VI, VO, and VZ are maintained in a non-energized state in processing during normal braking.

Processing in steps S240 to S280 is processing during the slip control. In this case, the regenerative cooperation control is not performed (that is, "Fg=0"). In step S240, the master cylinder valve VM and the switching valve VZ are energized. That is, the master cylinder valve VM is set to the OFF position, and a fluid connection between the master unit YM and the lower portion fluid unit YL is cut off, and the master unit YM and the lower portion fluid unit YL are in a non-communication state. The switching valve VZ is set to the ON position, and the master cylinder fluid passage HM, the pressure adjustment fluid passage HA, and the front and rear wheel servo fluid passages HF and HR are in a communication state. That is, the front wheel and rear wheel cylinders CWf and CWr are in communication with the servo chamber Rs.

In step S250, according to a calculation map Zfd similar to the calculation map in the block X170, and based on the operation amount Ba, the required brake force Fd is determined to be "0" when the operation amount Ba is in a range from "0" to the predetermined value bo, and when the operation amount Ba is equal to or larger than the predetermined value bo, the required brake force Fd is calculated to monotonically increase from "0" as the operation amount Ba increases. During the slip control, the required brake force Fd is provided by the friction brake force Fm only.

In step S260, the target hydraulic pressure Pt is calculated based on at least one of the required brake force Fd and the slip state quantity Js. For example, when the slip control is the anti-skid control, the target hydraulic pressure Pt is calculated based on the required brake force Fd. When the slip control is the vehicle stability control, friction brake forces of four wheels are separately calculated based on the required brake force Fd and the slip state quantity Js in order to stabilize a yaw motion of the vehicle. Then, the target hydraulic pressure Pt is determined based on a maximum friction brake force among the friction brake forces of four wheels.

In step S270, the electric motor MC and the pressure adjustment valve UA are controlled based on the target hydraulic pressure Pt. Similar to the processing in step S230, the electric motor MC is driven, the reflux path (A) of the brake fluid BF including the fluid pump HP is formed, and a feedback control of the pressure adjustment valve UA is performed so as to bring the adjustment hydraulic pressure Pa to be close to and coincide with the target hydraulic pressure Pt.

In step S280, the inlet valves VI and the outlet valves VO in the lower portion fluid unit YL are controlled, and the brake hydraulic pressures Pw are separately controlled. When it is required to reduce the brake hydraulic pressure Pw, the inlet valves VI are set to the OFF position, and the outlet valves VO are set to the ON position. Since the brake fluids BF in the wheel cylinders CW are discharged into the suction portion Qs of the fluid pump HP (that is, the reservoir RV), the brake hydraulic pressure Pw is reduced. When it is required to increase the brake hydraulic pressure Pw, the inlet valves VI are set to the ON position, and the outlet valves VO are set to the OFF position. Since the adjustment hydraulic pressure Pa is supplied to the wheel cylinders CW via the switching unit YZ, the brake hydraulic pressure Pw is increased. When it is required to maintain the brake hydraulic pressure Pw, the inlet valves VI are set to the OFF position, and the outlet valves VO are set to the OFF position. Since the brake fluid BF neither flows into the wheel cylinders CW nor is discharged, the brake hydraulic pressure Pw is maintained.

<Brake Control Device SC According to Second Embodiment>

Figure 3:
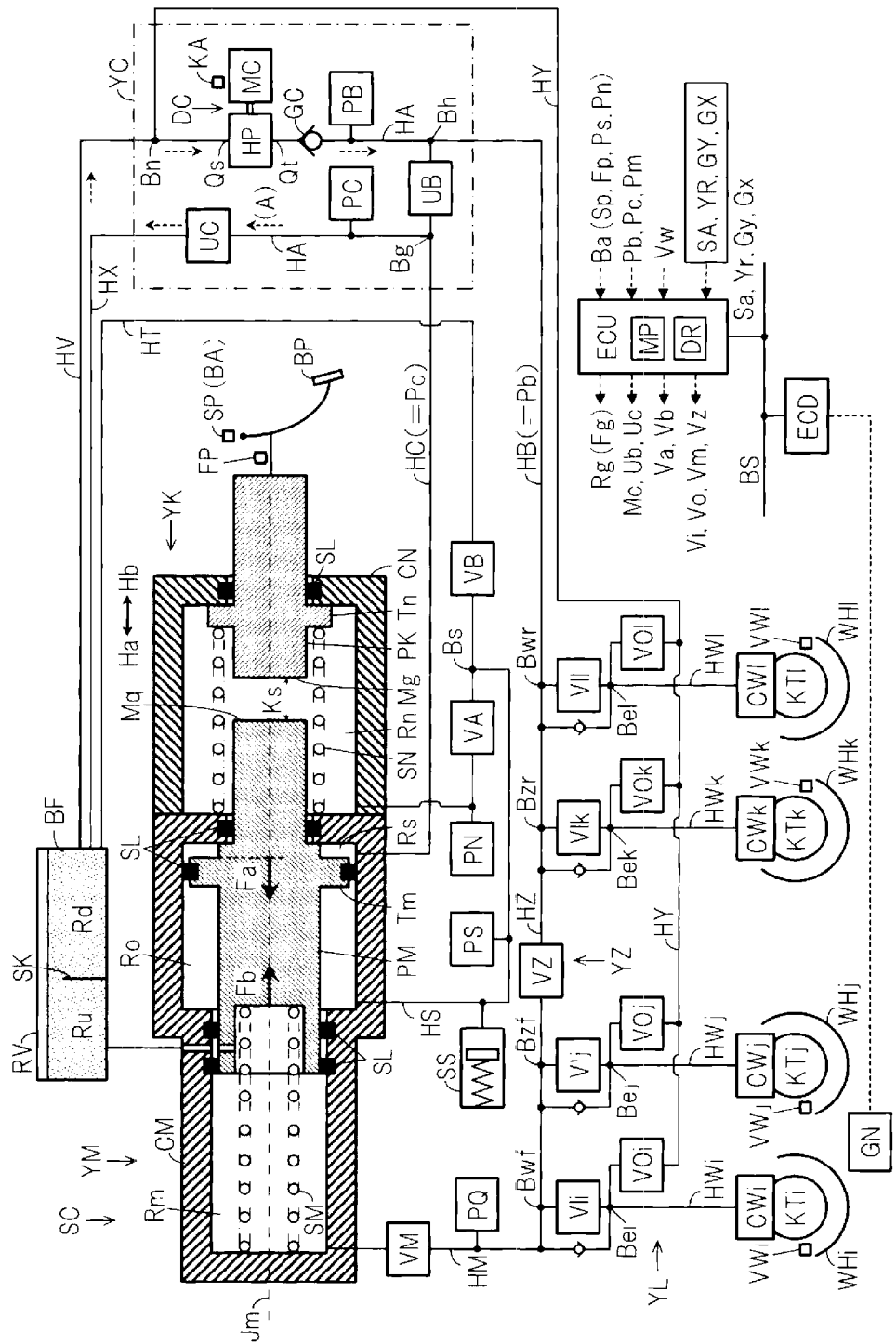
FIG. 3 is an overall configuration diagram illustrating a brake control device SC for a vehicle according to a second embodiment of the disclosure.

The brake control device SC according to a second embodiment will be described with reference to an overall configuration diagram in FIG. 3. In the second embodiment, the generator GN is provided on the front wheels WHf. The brake control device SC according to the second embodiment also includes the master unit YM, the regenerative cooperation unit (input unit) YK, a pressure adjustment unit YC, the lower portion fluid unit YL, the switching unit YZ, and the controller ECU. Since the master unit YM, the lower portion fluid unit YL, the switching unit YZ, and the regenerative coordination unit YK are the same as those in the first embodiment, description thereof will be omitted.

In the first embodiment, the pressure adjustment unit YA includes one pressure adjustment valve UA, and the same hydraulic pressure (adjustment hydraulic pressure) Pa is supplied to the servo chamber Rs and the rear wheel cylinder CWr. Instead, in the second embodiment, the pressure adjustment unit YC includes two pressure adjustment valves UB and UC, and a supply hydraulic pressure Pc to the servo chamber Rs and a supply hydraulic pressure Pb to the rear wheel cylinder CWr are independently and separately controlled by the controller ECU. Hereinafter, differences from the first embodiment will be mainly described.

Similar to the first embodiment, components, calculation processing, signals, characteristics, and values denoted by the same reference signs also have the same functions in the second embodiment. Subscripts "i" to "l" appended to ends of reference signs related to wheels are comprehensive reference signs indicating which wheel the reference signs are related to. "i" indicates a right front wheel, "j" indicates a left front wheel, "k" indicates a right rear wheel, and "l" indicates a left rear wheel. When the subscripts "i" to "l" are omitted, each reference sign indicates a general term for the four wheels. In fluid passages (movement paths of the brake fluid BF) of two systems, subscripts "f" and "r" attached to ends of reference signs are comprehensive reference signs indicating which system of front and rear wheel systems the reference signs are related to, wherein "f" is a front wheel system, and "r" is a rear wheel system. When the subscripts "f" and "r" are omitted, a reference number indicates a general term for the two systems. In a fluid passage, an "upper portion" is a side close to the reservoir RV and a "lower portion" is a side close to the wheel cylinder CW. In the reflux path (A), a side close to the discharge portion Qt of the fluid pump HP is referred to as an "upstream side", and a side away from the discharge portion Qt is referred to as a "downstream side".

[Pressure Adjustment Unit YC]

The pressure adjustment unit YC includes the electric pump DC, the check valve GC, the first and second pressure adjustment valves UB and UC, and first and second adjustment hydraulic pressure sensors PB and PC. The hydraulic pressures Pwf of the front wheel cylinders CWf and the hydraulic pressures Pwr of the rear wheel cylinders CWr are independently and separately adjusted by the pressure adjustment unit YC. Specifically, the brake hydraulic pressures Pwf of the front wheels WHf provided with the generator GN are adjusted to be equal to or smaller than the brake hydraulic pressures Pwr of the rear wheels WHr that are not provided with the generator GN.

As described above, the electric pump DC includes one electric motor MC and one fluid pump HP, and the fluid pump HP is rotated integrally with the electric motor MC. The suction port Qs of the fluid pump HP is connected to the first reservoir fluid passage HV, and the discharge port Qt of the fluid pump HP is connected to one end of the pressure adjustment fluid passage HA. The pressure adjustment fluid passage HA is provided with the check valve GC. The other end of the pressure adjustment fluid passage HA is connected to the reservoir fluid passage HX.

The two pressure adjustment valves UB and UC are provided in series in the pressure adjustment fluid passage HA (that is, the reflux path (A)). Specifically, the first pressure adjustment valve UB is provided in the pressure adjustment fluid passage HA. The second pressure adjustment valve UC is provided between the first pressure adjustment valve UB and the second reservoir fluid passage HX (downstream of the first pressure adjustment valve UB). Similar to the pressure adjustment valve UA, each of the first and second pressure adjustment valves UB and UC is a linear electromagnetic valve (a proportional valve or a differential pressure valve) in which a valve opening amount (a lift amount) is continuously controlled based on an energized state (for example, a supply current). The first and second pressure adjustment valves UB and UC are controlled by the controller ECU based on drive signals Ub and Uc. A normal open electromagnetic valve is adopted as each of the first and second pressure adjustment valves UB and UC.

When the electric pump DC is driven, the reflux path (A) of the brake fluid BF is formed to be "HV→HP→GC→UB→UC→HX→RV→HV". That is, in the reflux path (A), the first pressure adjustment valve UB is provided upstream of the second pressure adjustment valve UC, and the second pressure adjustment valve UC is provided downstream of the first pressure adjustment valve UB. Similar to the first embodiment, the second pressure adjustment valve UC may be connected to the first reservoir fluid passage HV. In this case, the reflux path (A) becomes "HV→HP→GC→UB→UC→HV".

When the first and second pressure adjustment valves UB and UC are in a fully ON state (when not energized, since the first and second pressure adjustment valves UB and UC are of a normal open type), both hydraulic pressures (adjustment hydraulic pressures) Pb and Pc in the pressure adjustment fluid passage HA are approximate to "0 (an atmospheric pressure)". When an energization amount to the second pressure adjustment valve UC is increased and the reflux path (A) is narrowed by the pressure adjustment valve UC, a hydraulic pressure (for example, the second adjustment hydraulic pressure Pc) upstream of the second pressure adjustment valve UC in the pressure adjustment fluid passage HA is increased from "0". When an energization amount to the first pressure adjustment valve UB is increased and the reflux path (A) is narrowed by the pressure adjustment valve UB, a hydraulic pressure Pb (for example, a hydraulic pressure between the pump HP and the first pressure adjustment valve UB) upstream of the first pressure adjustment valve UB is increased from the second adjustment hydraulic pressure Pc. The second adjustment hydraulic pressure Pc is adjusted by the second pressure adjustment valve UC so as to increase from "0 (the atmospheric pressure)", and the first adjustment hydraulic pressure Pb is adjusted by the first pressure adjustment valve UB so as to increase from the second adjustment hydraulic pressure Pc. In other words, since the first and second pressure adjustment valves UB and UC are arranged in series in the pressure adjustment fluid passage HA, the second adjustment hydraulic pressure Pc that is adjusted by the second pressure adjustment valve UC is adjusted to decrease from the first adjustment hydraulic pressure Pb (that is, "Pc≤Pb"). The pressure adjustment unit YC is provided with the first and second adjustment hydraulic pressure sensors PB and PC in the pressure adjustment fluid passage HA so as to detect the first and second adjustment hydraulic pressures Pb and Pc.

The pressure adjustment fluid passage HA is branched to a second servo fluid passage HC at a position Bg between the first pressure adjustment valve UB and the second pressure adjustment valve UC. The second servo fluid passage HC is connected to the servo chamber Rs. Therefore, the second adjustment hydraulic pressure Pc is introduced (supplied) into the servo chamber Rs. Since the master cylinder CM is connected to the front wheel cylinders CWf via the lower portion fluid unit YL, the second adjustment hydraulic pressure Pc is introduced indirectly to the front wheel cylinders CWf via the master cylinder CM. When the pressure receiving area rs of the servo chamber Rs and the pressure receiving area rm of the master chamber Rm are the same, the master hydraulic pressure Pm coincides with the second adjustment hydraulic pressure Pc.

The pressure adjustment fluid passage HA is branched to a first servo fluid passage HB at a position Bh between the fluid pump HP and the first pressure adjustment valve UB. The first servo fluid passage HB is connected to the rear wheel cylinders CWr via the lower portion fluid unit YL. Therefore, the first adjustment hydraulic pressure Pb is directly introduced (supplied) into the rear wheel cylinders CWr. The switching unit YZ is provided between the master cylinder fluid passage HM and the first servo fluid passage HB. That is, the communication fluid passage HZ is provided between the position Bzf in the master cylinder fluid passage HM and the position Bzr in the first servo fluid passage HB. The communication fluid passage HZ is provided with the switching valve VZ which is a normal close on-off valve.

In the second embodiment, the first adjustment hydraulic pressure Pb and the second adjustment hydraulic pressure Pc are independently and separately adjusted in a range of "Pb≥Pc". Accordingly, the regenerative cooperation control is performed after considering a front-rear distribution of a brake force. In a vehicle provided with the regenerative generator GN connected to the front wheels WHf, deceleration and stability of the vehicle can be ensured and regenerative energy can be maximized.

For example, when the required brake force Fd corresponding to the operation amount Ba is equal to or smaller than the regenerative brake force (the maximum regenerative force) Fx that can be generated by the generator GN, a control is performed such that "Pb=Pc=0", and the friction brake force Fm is not generated. Here, the required brake force Fd is a brake force for the entire vehicle, and is increased in accordance with an increase in the operation amount Ba. When the operation amount Ba is increased and the regenerative brake force Fg exceeds the maximum regenerative force Fx (see the block X180 in FIG. 2), the required brake force Fd cannot be provided by the regenerative brake force Fg. In this case, friction brake forces Fmr of the rear wheels WHr are increased by the first adjustment hydraulic pressure Pb that corresponds to a shortage of the regenerative brake force Fg with respect to the required brake force Fd (that is, "Fd−Fx"). At this time, "Pc=0" is maintained, only the regenerative brake force is applied to the front wheels WHf, and a friction brake force Fmf is not generated. A ratio of front wheel brake forces to a total brake force (a front-rear distribution ratio) Hf is gradually reduced from 100% when the friction brake forces Fmr of the rear wheels WHr are sequentially increased. When the operation amount Ba is further increased and the distribution ratio Hf reaches a preset predetermined ratio (a constant) hf, the second adjustment hydraulic pressure Pc starts to increase from "0". As the second adjustment hydraulic pressure Pc increases, the friction brake forces Fmf of the front wheels WHf are increased. Therefore, the regenerative brake force Fg is maintained at the maximum value Fx and the front-rear distribution ratio Hf is maintained at a desired value hf.

As described above, the front wheel hydraulic pressures Pwf and the rear wheel hydraulic pressures Pwr are separately adjusted by the first and second adjustment hydraulic pressures Pb and Pc in the second embodiment. Specifically, in accordance with an increase in the operation amount Ba, a generation state of a brake force is transitioned in order of "only the regenerative brake forces Fg of the front wheels WHf generated by the generator GN"→"(the regenerative brake forces Fg of the front wheels WHf)+(the friction brake forces Fmr of the rear wheels WHr generated by the first adjusted hydraulic pressure Pb)"→"(the regenerative brake forces Fg of the front wheels WHf)+(the friction brake forces Fmf of the front wheels WHf generated by the second adjustment hydraulic pressure Pc)+(the friction brake forces Fmr of the rear wheels WHr)". Accordingly, sufficient regenerative energy is ensured and a front-rear distribution of a brake force is appropriate, so that deceleration and stability of the vehicle can be ensured.

In the second embodiment, similar effects as those of the first embodiment can also be obtained. During normal braking including the regenerative cooperation control, members related to the master cylinder fluid passage HM (the master chamber Rm, the front wheel cylinders CWf, and the like), members related to the servo chamber Rs (the first and second servo fluid passages HB and HC, the pressure adjustment fluid passage HA, the rear wheel cylinders CWr, and the like), and members related to the simulator SS (the reaction force chamber Ro, the input chamber Rn, the simulator fluid passage HS, and the like) are fluidically separated from each other by the master piston PM, and the brake fluid BF does not flow into or out of between these members. In other words, the three hydraulic pressure chambers Rm, Rs, and Ro are independent of each other.

Since the simulator SS is not directly affected by a fluctuation of hydraulic pressures from the master chamber Rm and the servo chamber Rs, the simulator SS is less likely to be affected by a pulsation of the fluid pump HP and a fluctuation of the brake operation force Fp can be reduced. As a result, a suitable operation characteristic of the brake operation member BP (a relationship between the operation displacement Sp and the operation force Fp) is achieved. Although the simulator SS is affected by a force fluctuation via the master piston PM or the like, the fluctuation is attenuated by friction resistance of the seal SL or the like, elasticity in a fluid passage, narrowing by the first on-off valve VA (a valve seat hole), and the like.

Since the members related to the master chamber Rm and the members related to the servo chamber Rs are fluidically separated by the master piston PM, an amount of the brake fluid BF discharged to an outside of the device due to a failure or the like is limited. Therefore, reliability of the brake control device SC can be improved.

Further, the switching unit YZ can selectively achieve "a first state in which the master chamber Rm and the front wheel cylinders CWf are in a communication state and the front wheel cylinders CWf and the first servo fluid passage HB are in a non-communication state" and "a second state in which the master chamber Rm and the front wheel cylinders CWf are in a non-communication state and the front wheel cylinders CWf and the first servo fluid passage HB are in a communication state". When the slip control is not performed (that is, during normal braking), the master cylinder valve VM is controlled to be at the ON position and the switching valve VZ is controlled to be at the OFF position, so that the switching unit YZ achieves the first state. The front wheel brake hydraulic pressures Pwf of the front wheel cylinders CWf are adjusted by the master chamber Rm, and the rear wheel brake hydraulic pressures Pwr of the rear wheel cylinders CWr are adjusted by the adjustment hydraulic pressure Pb.

When the slip control is performed, the master cylinder valve VM is set to the OFF position and the switching valve VZ is set to the ON position, so that the switching unit YZ achieves the second state. The master cylinder valve VM is set to the OFF position, so that the master chamber Rm and the front wheel cylinders CWf are cut off and the three hydraulic pressure chambers Rm, Ro, and Rs are brought into a fluid lock state. The brake fluid BF that was adjusted to the hydraulic pressure Pb is supplied to the front wheel and rear wheel cylinders CWf and CWr via the switching unit YZ, thereby increasing the front wheel and rear wheel brake hydraulic pressures Pwf and Pwr. The inlet valves VI are set to the OFF position and the outlet valves VO are set to the ON position, and the brake fluid BF is discharged from the front wheel and rear wheel cylinders CWf and CWr into the suction portion Qs of the fluid pump HP (that is, the reservoir RV) via the return fluid passage HY, thereby separately reducing the front wheel and rear wheel brake hydraulic pressures Pwf and Pwr. The inlet valves VI and the outlet valves VO are OFF and movement of the brake fluid BF is prevented, thereby maintaining the front wheel and rear wheel brake hydraulic pressures Pwf and Pwr. It is not necessary to add an electric pump separate from the electric pump DC in order to perform the slip control. Therefore, the brake control device SC can be simplified, and a size and a weight can be reduced.

<Brake Control Device SC According to Third Embodiment>

Figure 4:
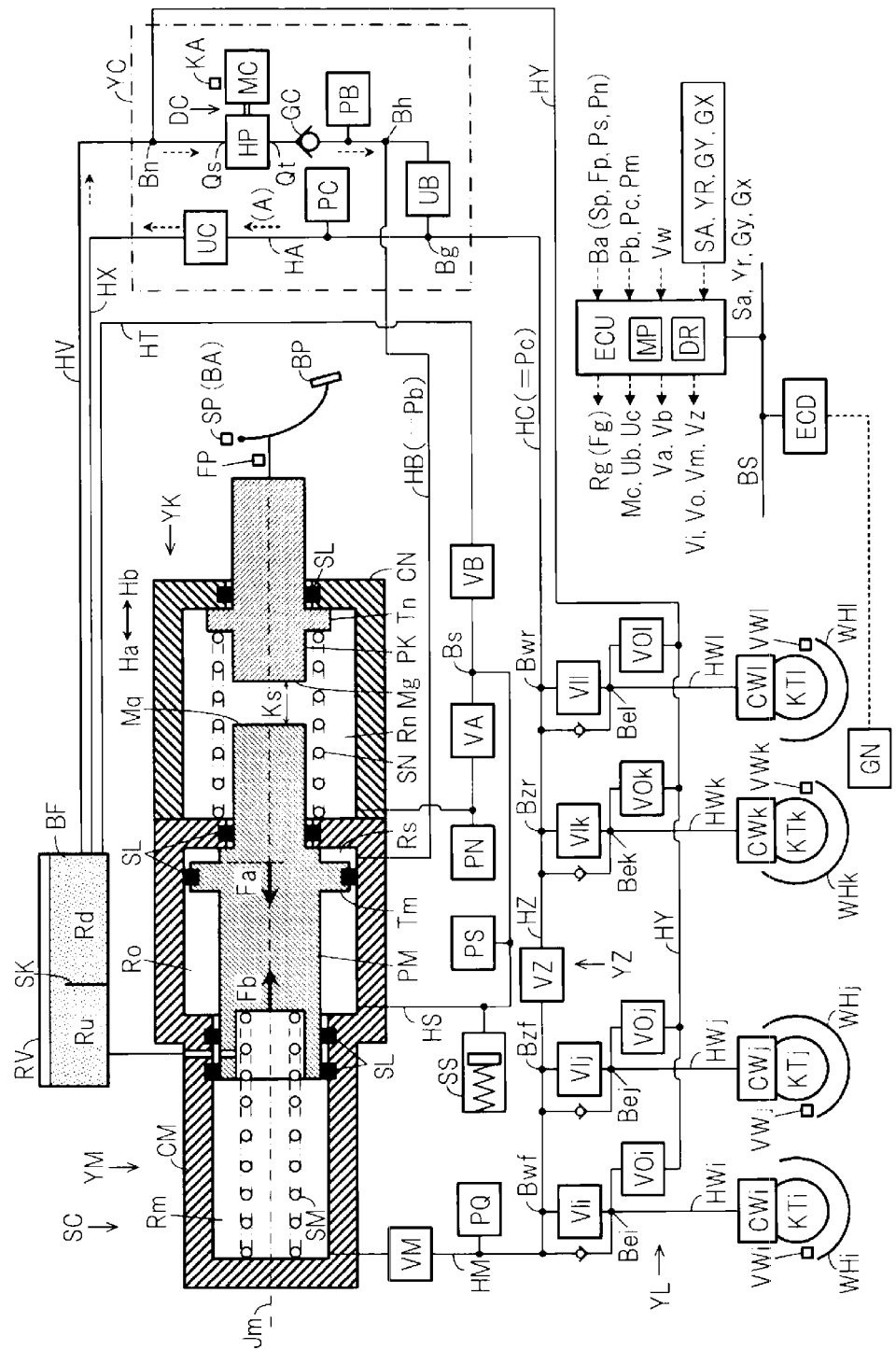
FIG. 4 is an overall configuration diagram illustrating a brake control device SC for a vehicle according to a third embodiment of the disclosure.

A brake control device SC according to a third embodiment will be described with reference to FIG. 4. In the second embodiment, the first adjusted hydraulic pressure Pb is introduced into the rear wheel cylinders CWr via the first servo fluid passage HB and the second adjustment hydraulic pressure Pc (≤ Pb) is supplied to the servo chamber Rs via the second servo fluid passage HC in the vehicle provided with the generator GN connected to the front wheels WHf. The third embodiment is applied to a vehicle provided with the generator GN connected to the rear wheels WHr. Therefore, the first adjustment hydraulic pressure Pb (≥Pc) is supplied to the servo chamber Rs via the first servo fluid passage HB (a fluid passage branched from the pressure adjustment fluid passage HA at the position Bh upstream of the first pressure adjustment valve UB). The second adjustment hydraulic pressure Pc is supplied to the rear wheel cylinders CWr via the second servo fluid passage HC (a fluid passage branched from the pressure adjustment fluid passage HA at the position Bg downstream of the first pressure adjustment valve UB).

The rear wheel hydraulic pressures Pwr and the front wheel hydraulic pressures Pwf are respectively adjusted by the first and second adjustment hydraulic pressures Pb and Pc. Specifically, in accordance with an increase in the operation amount Ba, a generation state of a brake force is transitioned in order of "only the regenerative brake forces Fg of the rear wheels WHr generated by the generator GN"→"(the friction brake forces Fmf of the front wheels WHf generated by the first adjusted hydraulic pressure Pb)+(the regenerative brake forces Fg of the rear wheels WHr)"→"(the friction brake forces Fmf of the front wheels WHf generated by the second adjustment hydraulic pressure Pc)+(the regenerative brake forces Fg of the rear wheels WHr)+(the friction brake forces Fmr of the rear wheels WHr)". Accordingly, in the vehicle provided with the generator GN connected to the rear wheels WHr, sufficient regenerative energy is ensured and a front-rear distribution of a brake force is appropriate, so that deceleration and stability of the vehicle can be ensured.

In the third embodiment, similar effects as those of the first and second embodiments can also be obtained. Three hydraulic pressure chambers Rm, Rs, and Ro are independent of each other by the master piston PM. Therefore, an influence from a pulsation of the fluid pump HP can be prevented, good brake operation characteristics can be ensured, and reliability of the brake control device SC can be improved. Further, since the lower portion fluid unit YL is of a discharge type (a type in which the brake fluid BF is discharged into the reservoir RV or the like during reducing the brake hydraulic pressure Pw), the device can be simplified.

The invention claimed is:

1. A brake control device for a vehicle that adjusts hydraulic pressures in a front wheel cylinder and a rear wheel cylinder in response to an operation of a brake operation member of the vehicle, the brake control device comprising:
   a pressure adjustment unit provided with 1) an electric pump connected to a reservoir of the vehicle, and 2) a pressure adjustment valve configured to adjust a hydraulic pressure of a brake fluid discharged by the electric pump to an adjustment hydraulic pressure;

a switching valve operable between an open state in which the switching valve does not cut off the adjustment hydraulic pressure from fluid communication with the front wheel cylinder and a closed state in which the switching valve cuts off the adjustment hydraulic pressure from fluid communication with the front wheel cylinder;

a master unit provided with 1) a servo chamber in which the adjustment hydraulic pressure is converted into a forward force of a master piston, and 2) a master chamber that is fluidically separated from the servo chamber by the master piston and that is connected to the front wheel cylinder and in which a rearward force that is converted from the hydraulic pressure in the front wheel cylinder and is applied to the master piston, a direction of the rear force being opposite to a direction of the forward force;

a master cylinder valve operable between an open state in which the master cylinder valve does not cut off the master chamber from fluid communication with the front wheel cylinder and a closed state in which the master cylinder valve cuts off the master chamber from fluid communication with the front wheel cylinder;

an input unit provided with an input chamber whose volume changes corresponding to an operation of the brake operation member and a simulator that is configured to apply an operation force to the brake operation member in response to a flow of the brake fluid from the input chamber; and a controller configured to control the electric pump and the pressure adjustment valve, wherein, during normal braking including regenerative cooperation control, the master cylinder valve is set to the open state and the switching valve is set to the closed state, and wherein the pressure adjustment unit, in a state in which the master cylinder valve is set to the open state and the switching valve is set to the closed state, supplies the adjustment hydraulic pressure to the servo chamber via a front wheel servo fluid passage and directly supplies the adjustment hydraulic pressure to the rear wheel cylinder via a rear wheel servo fluid passage.

2. The brake control device according to claim 1, further comprising:

a switching unit configured to selectively achieve a first state in which the master chamber and the front wheel cylinder are in a communication state and the front wheel cylinder and the rear wheel servo fluid passage are in a non-communication state, and a second state in which the master chamber and the front wheel cylinder are in a non-communication state and the front wheel cylinder and the rear wheel servo fluid passage are in a communication state;

the switching unit includes the master cylinder valve and the switching valve; and a fluid unit configured to reduce the hydraulic pressure in the front wheel cylinder by discharging the brake fluid in the front wheel cylinder to a suction portion of the electric pump, and reduce the hydraulic pressure in the rear wheel cylinder by discharging the brake fluid in the rear wheel cylinder to the suction portion of the electric pump, wherein the controller is configured to perform a slip control that is at least one of an anti-skid control for preventing locking of wheels of the vehicle and a vehicle stability control for stabilizing a yaw motion of the vehicle, and the switching unit is configured to achieve the first state when the slip control is not performed, and achieve the second state when the slip control is performed.

\* \* \* \* \*